E. L. HOTCHKISS.
EXTRICATOR TIRE FOR AUTOMOBILES.
APPLICATION FILED JULY 22, 1919.
1,374,920.  Patented Apr. 19, 1921.
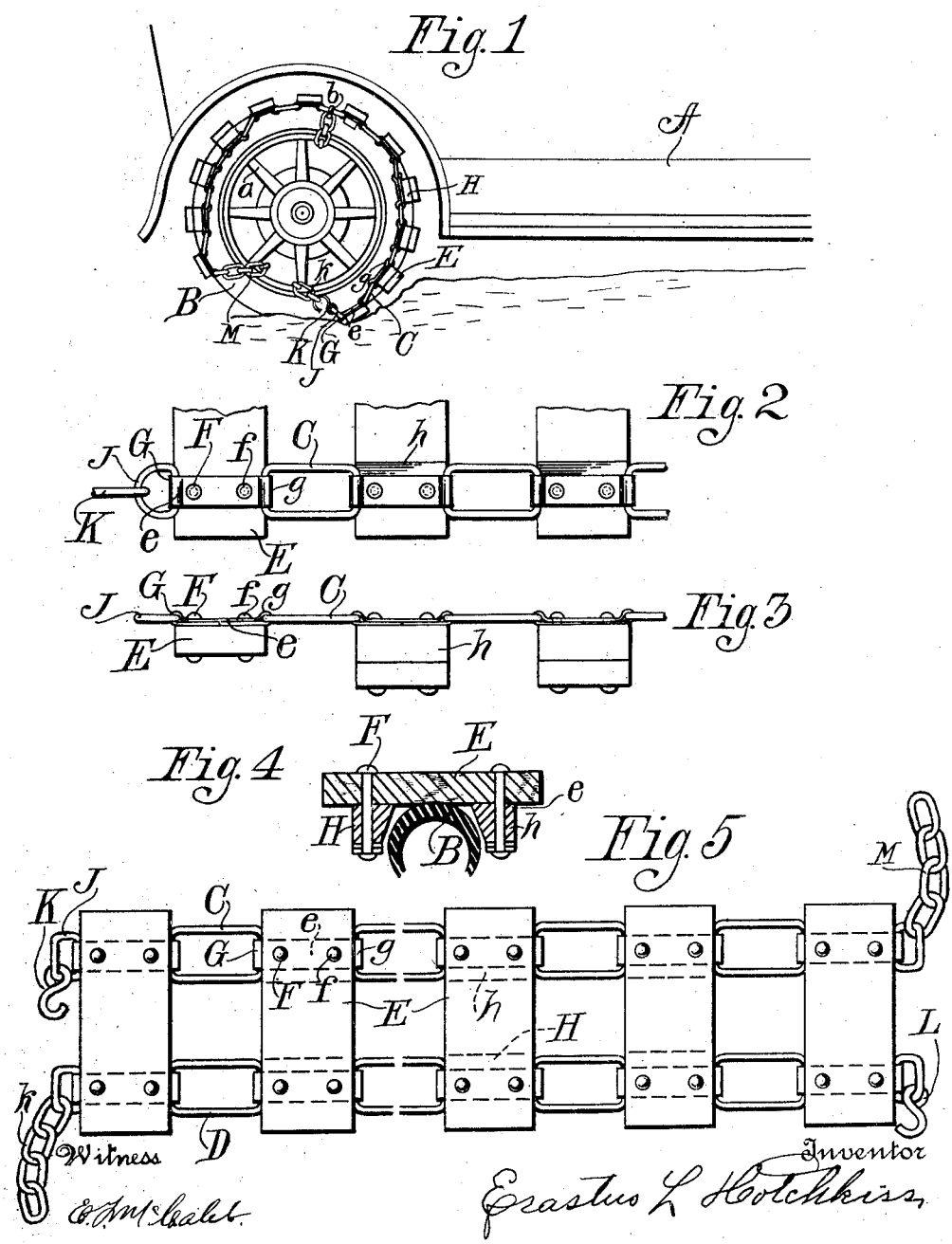

UNITED STATES PATENT OFFICE.

ERASTUS L. HOTCHKISS, OF EDINBORO, PENNSYLVANIA.

EXTRICATOR-TIRE FOR AUTOMOBILES.

1,374,920. Specification of Letters Patent. Patented Apr. 19, 1921.

Application filed July 22, 1919. Serial No. 312,469.

*To all whom it may concern:*

Be it known that I, ERASTUS L. HOTCHKISS, citizen of the United States, residing at Edinboro, in the county of Erie and State of Pennsylvania, have invented certain new and useful Improvements in Extricator-Tires for Automobiles, of which the following is a specification.

This invention relates to extricator tires for automobiles generally, whether pleasure cars or trucks, and it belongs to that class or type of tractor devices which are carried as extra parts to be put on the rear wheels when occasion demands, in order that the machine may by its own power raise itself from a sunken position in mud or mire, snow, or when it is desired to run up a bank of soft earth.

The object of this invention is the production of a tire of the character stated for use in emergencies, which comprises parts of special construction and arrangement whereby it is believed the spaced blocks in parallel arrangement are kept from slipping from the tire connected with them.

The construction and arrangement of the parts of this invention are set forth in the accompanying drawings, of which Figure 1 represents the side view of the rear portion of an automobile to the rear wheel of which this invention has been applied. Fig. 2 is a plan view, enlarged, showing the eye strap connectors and straight-ended links on the face of this invention that goes against the rubber tire. Fig. 3 is an end view of several blocks connected together in accordance with this invention. Fig. 4 is a section of one of the blocks in the direction of its length and shows in cross-section a pair of the side guards attached between the links near the ends of the blocks and in line with the connectors to prevent the blocks from slipping endwise from a tire. Fig. 5 is a plan view of all parts assembled, showing the side or face of this invention which engages the roadway.

Throughout the drawings and description, the same letter is employed to refer to the same part.

Considering the drawings, the automobile A has the rear wheel $a$ provided with the usual rubber tire casing B.

A series of chain links C and D are arranged to pivotally couple a row of parallel wooden blocks E. Fixed upon the blocks transversely near their ends are the eye strap connectors $e$. Those connectors are formed usually in practice by bending a one-piece strap upon itself as best shown in Fig. 3. The eye straps are held in place upon the blocks by bolts F and $f$, and they are formed with the eyes or hollow ends G and $g$. Those cylindrical, hollow portions or terminations of the eye strap connectors $e$, have straight axes, and it will be noted that the links C and D have straight ends engaging the eyes. In this way, while the row of blocks is formed into a chain that may be readily curved about the tire of a wheel, the blocks are prevented from sidewise displacement, and are maintained parallel one with the other.

As best illustrated in Fig. 4, the side guards H and $h$ are secured upon the eye straps and in line with them by the bolts F. The side guards lie as shown, adjacent to the sides of the tire B, and they project somewhat from the blocks in order to prevent the blocks from slipping endwise from the tire. It will be noted in Fig. 1 that the projecting guards H and $h$ are provided for those blocks E which are near the ends of the series or row of blocks, and that the links C follow a line that does not coincide with the peripheral line of the tire B but lies within such peripheral line. In fact the links arrange themselves along the sides of the rubber tire between the guards H, and thereby act as additional guards to keep the series of blocks from being forced off the rubber tire B in service. The same may be stated of the links D on the other side of the wheel.

To secure the row or chain of parallel blocks to a wheel of an automobile, the end of the row or chain of blocks is provided at one end with the pivotal link J and hook K, and at the same end with the short chain $k$. At the other end of the row of blocks is the link and hook L and the chain M.

In the operation of this invention, the row of blocks is placed around the tire B of the wheel. The chains $k$ and M are passed around the tire and between the spokes of the wheel, and the hooks K and L engaged therewith. An additional intermediate chain $b$ may be employed if found desirable. Now, the wheel is provided with a peripheral row of broad, spaced blocks, which sink into the mud or snow only a little way, and which act further to engage the mud, sand or snow and enable the machine by its own power to extricate itself from almost any mired situation. This invention is very strong, and is easily placed upon the wheel and as easily removed therefrom. It will be understood, that in practice each of the rear or driving wheels of the automobile is provided with a row of blocks connected and arranged in accordance with this invention. It is not intended ordinarily that this invention shall be used on the wheels excepting when the vehicle is or is liable to become mired or stalled. To apply this invention quickly and easily, one end of the series or chain of blocks is secured to the wheel and the chain laid out straight in front of the wheel, and then the vehicle is run right upon it. It is very important that the chain of blocks shall lie straight as the vehicle runs upon it, and the construction described with the single link between adjacent ends of succeeding blocks, each link with straight ends engaging the hollow cylindrical ends or eyes of the strap connectors maintains the essential straight alinement perfectly.

Having now explained this invention, and the mode of its use, what I claim is:—

In a tractor device for automobile wheels, the combination with a series of spaced blocks arranged side by side, of connectors secured crosswise of the blocks on the under side near the ends of the blocks, the said connectors having hollow, cylindrical terminations, single links arranged between adjacent ends of succeeding blocks and each link having straight ends engaging the hollow cylindrical ends of the connectors whereby the blocks are maintained parallel with each other and against displacement one with respect to another; a predetermined number of blocks at each end of the series of blocks having side guards projecting toward the center of the wheel, and the said connectors and links being secured to the said side guards whereby the said connectors near the ends of the series of blocks follow lines within the peripheral line of the wheel and prevent displacement of the ends of the series of blocks sidewise.

In testimony whereof I affix my signature.

ERASTUS L. HOTCHKISS.